United States Patent [19]
Kesmodel et al.

[11] Patent Number: 5,055,680
[45] Date of Patent: Oct. 8, 1991

[54] SCANNING TUNNELING MICROSCOPE

[75] Inventors: Larry Kesmodel; Michael W. Kiser, both of Bloomington, Ind.

[73] Assignee: LK Technologies, Inc., Bloomington, Ind.

[21] Appl. No.: 503,582

[22] Filed: Apr. 3, 1990

[51] Int. Cl.$^5$ .................. G01N 23/00; H01J 37/00
[52] U.S. Cl. .................. 250/306; 250/307; 250/442.1
[58] Field of Search .................. 250/306, 307, 423 F, 250/442.1; 369/101, 111; 73/105

[56] References Cited

U.S. PATENT DOCUMENTS

| | | | |
|---|---|---|---|
| 4,668,865 | 5/1987 | Gimzewski et al. | 250/306 |
| 4,724,318 | 2/1988 | Binning | 250/306 |
| 4,733,091 | 3/1988 | Robinson et al. | 250/442.1 |
| 4,760,567 | 7/1988 | Crewe | 369/101 |
| 4,762,996 | 8/1988 | Binning et al. | 250/442.1 |
| 4,798,989 | 1/1989 | Miyazaki et al. | 310/328 |
| 4,800,274 | 1/1989 | Hansma et al. | 250/306 |
| 4,818,838 | 4/1989 | Young et al. | 250/441.1 |
| 4,831,614 | 5/1989 | Duerig et al. | 369/111 |
| 4,837,445 | 6/1989 | Nishioka et al. | 250/306 |
| 4,841,148 | 6/1989 | Lyding | 250/306 |
| 4,859,896 | 8/1989 | Anders et al. | 310/328 |
| 4,866,271 | 9/1989 | Ono et al. | 250/306 |
| 4,880,975 | 11/1989 | Nishioka et al. | 250/306 |
| 4,894,538 | 1/1990 | Iwatsuki et al. | 250/306 |
| 4,908,519 | 3/1990 | Park et al. | 250/306 |

OTHER PUBLICATIONS

G. Binnig et al., "Scanning Tunneling Microscopy", *IBM Journal of Research & Development*, vol. 30, No. 4, Jul. 1986, pp. 355–369.

*Primary Examiner*—Bruce C. Anderson
*Attorney, Agent, or Firm*—Lowe, Price, LeBlanc & Becker

[57] ABSTRACT

A scanning tunneling microscope is disclosed which includes a frame assembly having upper frame members coupled to lower frame members by an external vibration isolation structure, a sample carousel configured to receive at least one sample to be scanned, and a probe carousel configured to receive at least one probe module including a probe tip. The sample and probe carousels are coupled to the upper frame members and sample and probe actuators are provided to rotate the carousels. A positioning mechanism is used to maintain a scanning distance between the probe tip and the sample carousel. A control unit controls the overall operation of the actuators to rotate the carousels and the operation of the positioning mechanism to maintain the scanning distance.

18 Claims, 5 Drawing Sheets

SCANNING TUNNELING MICROSCOPE

FIELD OF THE INVENTION

The present invention is related to structure and operation of a scanning tunneling microscope. In particular, the invention is related to a scanning tunneling microscope system, including an external vibration isolation structure, that permits a plurality of samples to be readily scanned in a vacuum environment by one or more probe modules.

BACKGROUND OF THE INVENTION

Scanning tunneling microscopes (hereinafter referred to as STM) exploit an effect referred to as electron tunneling which occurs across distances of a few nanometers. According to the principles of quantum physics, an electron will pass through an insulator if the thickness of the insulator is limited to a few nanometers. In other words, an electron orbiting in an electron cloud about an atom residing on a first conductor surface can appear to leap across an insulating gap, if sufficiently small, to an electron cloud about a nearby atom residing on the surface of a second conductor. The above-described effect is referred to as tunneling and the electron flow is referred to as the tunneling current.

Tunneling current is used in STMs to map the surface of a sample. Generally, a probe consisting of a sharp tip or stylus is scanned back and forth over the surface of the sample to be examined. A vacuum, gas or liquid can be used as a tunneling barrier or insulator between the probe tip and sample surface. Topographical variations in the surface of the sample result in changes in the distance separating the probe tip and the sample surface, namely, the distance increases when the probe tip moves across a valley or low spot in the sample surface and decreases when the tip moves over a high point. The variations in distance between the probe tip and sample surface result in proportional variations in tunnel current. Thus, a plot of the tunnel current versus the position of the probe tip yields a topographical trace or picture of the sample surface. A detailed discussion of STMs is provided in "Scanning Tunneling Microscopy" by G. Binnig and H. Rohrer, IBM Journal of Research Development, Vol. 30, No. 4, pp. 355-369, July 1986. See also U.S. Pat. No. 4,343,993 issued to Binnig et al.

In practice, tunnel current changes are used as feedback to reposition the probe tip above the sample surface at a constant height. The probe tip is maintained at a constant height to prevent it from "crashing" into a tall surface protrusion or running over a deep depression or valley in the surface that might result in a loss of tunneling current. The coordinates of the probe tip position within the plane of the sample surface (X and Y coordinates) as well as the coordinate position above the surface (Z coordinate) are then utilized to generate the topographical trace.

As will be readily appreciated from the discussion above, a number of critical factors are involved in STM design in order to achieve accurate results. For example, an incredible degree of mechanical precision is required to "fly" the probe tip at a constant nanometer separation distance over an undulating sample surface. Conventional STMs have employed a combination of coarse and fine positioning mechanisms to control the probe tip position. Generally, the coarse positioning mechanism is a mechanical device having a positioning range on the order of several millimeters that moves the sample into proximity with the probe tip prior to the measurement operation. The actual scanning of the probe tip during the measurement operation is controlled by the fine positioning mechanism.

One method of obtaining fine positioning has been to mount the probe tip on piezoelectric crystals. The crystals change in size when a voltage is applied, thereby permitting small variations in positioning to be accomplished by controlling the voltage applied to the crystals. U.S. Pat. No. 4,894,538 issued to Iwatsuki et al. discloses one example of a piezoelectric type positioning system. The lateral range of piezoelectric positioning systems is usually limited to less than 100 microns.

Another critical factor in obtaining accurate results is the isolation of the probe unit from external sources of vibration. Early laboratory STM designs utilized superconducting levitation to accomplish external vibration isolation, which was not particularly appropriate for practical STM designs. Later generation devices employed spring systems utilizing elongated springs under tensile (stretching) forces or viton dampers, consisting of several metallic stacking plates separated by spacers, to provide vibration isolation. The use of elongated springs to provide vibration isolation, however, leads to a much less compact instrument structure. Viton dampers alone exhibit a higher resonant frequency than spring systems which is also a drawback.

Still another critical factor is expansion and contraction of the STM structure due to temperature variations. Expansion and contraction of the structural elements of the STM can directly impact the critical probe tip to sample surface spacing. At a minimum, the variation in tip to sample spacing due to thermal expansion and contraction will result in error being introduced into the scanning results. In a worst case situation, the probe tip could be damaged by coming into contact with the sample surface due to positioning errors introduced by the thermal expansion and contraction.

The resolution of the STM depends a great deal on the condition of the probe tip. As a result, the probe tip might have to be reworked or replaced if it comes into contact with the sample surface. The probe tip must also be periodically replaced due to normal wear. Replacement of the probe tip in conventional STMs is not particularly convenient. In many cases, the basic structure of the STM must be broken down to permit probe replacement. This is especially disadvantageous when working in vacuum environments, as a good deal of time is lost if the probe tip cannot be readily interchanged without restoring normal atmospheric conditions.

In view of the above, it would be desirable to provide an STM that is compact in structure, is capable of coarse and fine positioning of the probe tip with a high degree of accuracy and reproducibility, provides isolation from external sources of vibration, provides for thermal compensation to counteract thermal expansion and contraction of structural elements, and permits ready replacement of the probe tip.

SUMMARY OF THE INVENTION

An object of the present invention is to provide an STM that is capable of coarse and fine lateral and vertical positioning of a probe tip in relation to a sample surface with a high degree of accuracy and reproducibility.

Another object of the invention is to provide an STM of compact design that provides external vibration isolation.

A still further object of the invention is to provide an STM that includes a mechanism to compensate for thermal expansion and contraction of structural elements.

An additional object of the invention is to provide an STM in which probe tips, including probes with differing piezoelectric characteristics, can be readily interchanged, especially in a vacuum environment, and multiple samples can be scanned with a minimum of probe and sample handling.

These and other objects are achieved by the invention which includes a frame assembly having upper frame members coupled to lower frame members by an external vibration isolation structure; a sample carousel configured to receive at least one sample to be scanned and a probe carousel configured to receive at least one probe module including a probe tip, wherein the sample and probe carousels are coupled to the upper frame members; a sample actuator and a probe actuator respectively coupled to the sample carousel and the probe carousel; a positioning mechanism for maintaining a scanning distance between the probe tip and the sample carousel; and a control unit for controlling the operation of the sample actuator and the probe actuator to rotate the sample and probe carousels and for controlling the operation of the positioning mechanism to maintain the scanning distance.

The external vibration isolation structure preferably includes compression isolators formed of coil springs with elastomers provided therein. The probe carousel is preferably coupled to the upper frame member by a probe frame and the sample carousel is preferably coupled to a sample frame that in turn is coupled to the probe frame via a pivot connection, and the positioning mechanism preferably includes an approach ramp movably coupled to the probe frame. The sample frame includes an approach roller that contacts the approach ramp, whereby movement of the approach ramp by an actuator mechanism causes the sample frame to pivot about the pivot connection. A thermal expansion compensator is used to couple the actuator mechanism to the probe frame to counteract thermal dimensional changes in the actuator mechanism.

One or more probe modules can be loaded on the probe carousel. Each probe module includes switching contacts that connect with stationary contacts mounted to the probe frame when the probe module is moved into a scanning position.

Other objects and advantages of the invention will become apparent in light of the detailed description of the preferred embodiment of the invention provided below and the accompanying figures.

BRIEF DESCRIPTION OF THE DRAWINGS

With the above as background, reference should now be made to the following detailed description of the preferred embodiment of the invention and the accompanying figures in which.

DETAILED DESCRIPTION OF THE PREFERRED EMBODIMENT

Figure 1:
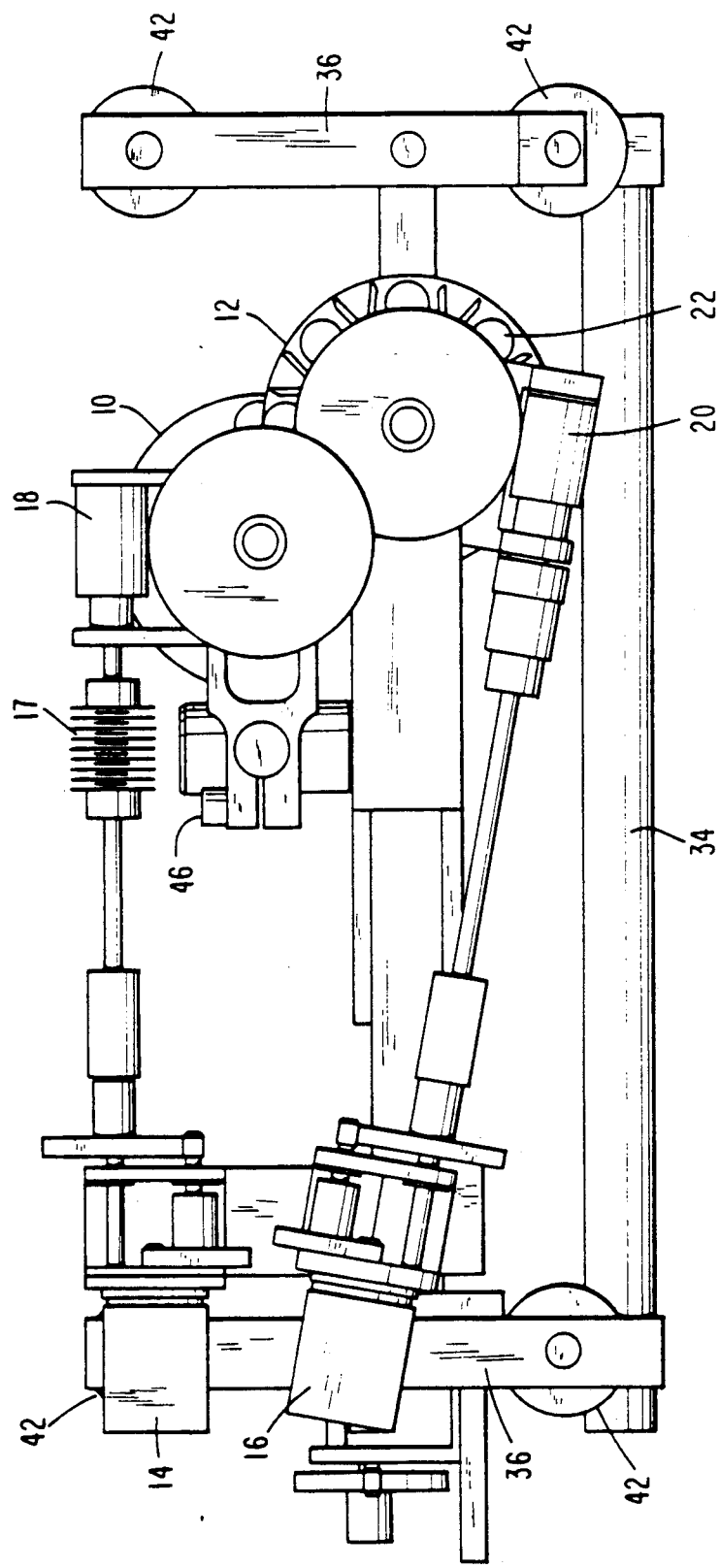
FIG. 1 is a top view of an STM in accordance with a preferred embodiment of the invention.
Figure 2:
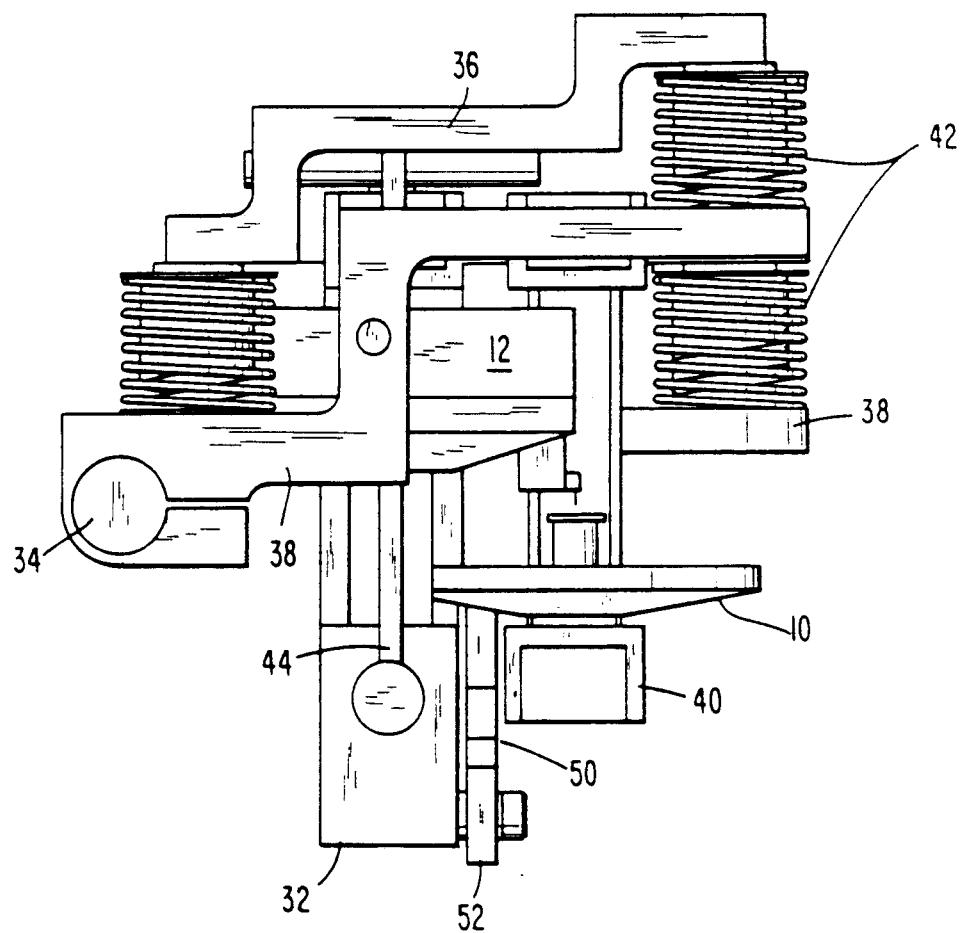
FIG. 2 is a side view of the STM illustrated in FIG. 1 with the worm drives omitted for clarity.

Referring now to FIGS. 1 and 2, an STM in accordance with a preferred embodiment of the invention is shown including a sample carousel 10 and a probe carousel 12 that are rotatably driven by a sample actuator 14 and a probe actuator 16. The sample actuator 14 and the probe actuator 16 are respectively coupled to the sample and probe carousels 10 and 12 by a sample worm drive 18 and a probe worm drive 20. Vacuum compatible stepping motors, Princeton Research Instruments Model No. AP having a step resolution of 15 degrees, are preferably utilized for the sample actuator 14 and probe actuator 16, although other types of motors may be readily employed. The sample and probe worm drives 18 and 20 in combination with the actuators provide a gear ratio of 7200:1, whereby a one step increment of the sample and probe actuators 14 and 16 results in a 1.0 micron displacement of the sample and probe carousels 10 and 12. The use of the sample and probe actuators 14 and 16 permits a high degree of resolution in the relative movement of the sample and probe carousels 10 and 12 that is readily reproducible, and provides the X—Y coarse positioning of the surface of a sample placed on the sample carousel 10.

Figure 3:
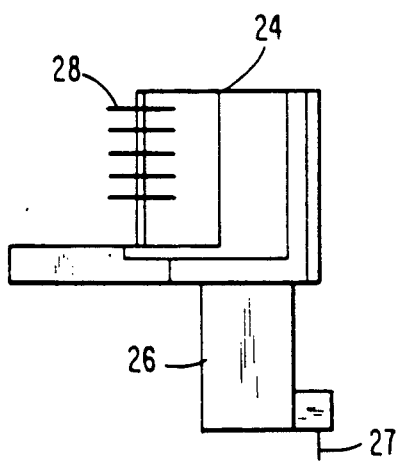
FIG. 3 is a side view of a modular probe unit to be mounted on the probe carousel illustrated in FIGS. 1 and 2.
Figure 4:
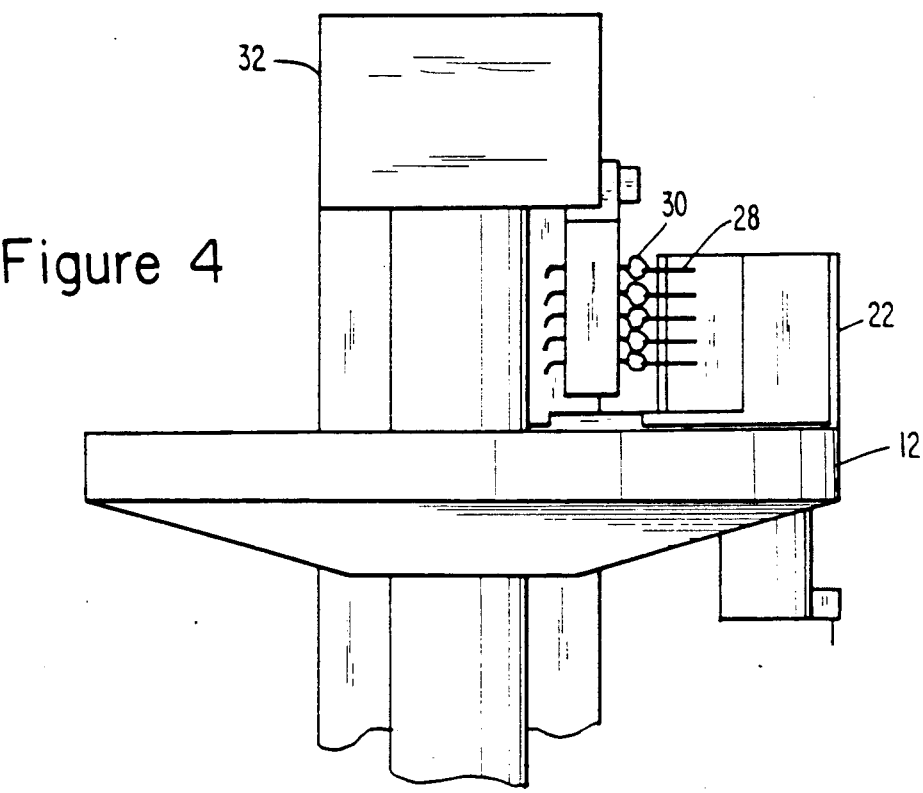
FIG. 4 illustrates the mounting of the modular probe unit of FIG. 3 on the probe carousel illustrated in FIGS. 1 and 2.

The probe carousel 12 is adapted to receive a plurality of probe modules 22. A illustrated in FIG. 3, each of the probe modules 22 includes a module body 24 in which a conventional tube type scanning probe assembly 26, including a probe tip 27, is mounted. The probe assembly is preferably constructed from Type PZT-5H piezoelectric tube scanners manufactured by Stavely Sensors, Inc. provided with a platinum iridium alloy probe tip, although other types of scanners and probe tip materials can be readily employed. Wiper type switching contacts 28 are also coupled to the module body 24 and are used to provide electrical connection between the probe module 22 and external control circuitry. One or more of the probe modules 22 are mounted on the probe carousel 12 as illustrated in FIG. 4. The switching contacts 28 of the probe modules 22 make contact with stationary contacts 30 mounted to a probe frame 32 at a scanning position as the probe carousel 12 is rotated by the probe worm drive 20, as will be described in greater detail below.

The modular probe design permits different types of probes to be mounted on the probe carousel 12 for scanning. For example, probe modules with different piezoelectric tube length, width, thickness or material composition can be mounted to achieve substantially different scan ranges (nanometer/volt) of the piezoelectric probe in the X, Y and Z directions. In addition, probe modules with different shaped tips can be mounted so that one or more samples can be scanned by the different tips. Further, spare probe modules can be mounted on the probe carousel 12 so that a spare probe module can be quickly rotated to the scanning position should a probe module be damaged, thereby eliminating delays associated with the replacement or repair of damaged or worn probe tips.

The sample carousel 10 is adapted to receive a plurality of sample holders of varying types. For example, one or more sample holders, sometimes referred to as an SEM stub, may be placed on the sample carousel 10 (SEM stubs are currently in use with ESCA equipment manufactured by Vacuum Generators, Ltd.). The sample carousel 10 is then rotated by the sample actuator 14 to bring each of the sample holders to the scanning position.

Referring back to FIGS. 1 and 2, the sample and probe carousels 10; and 12 along with the sample and probe actuators 14 and 16; are mounted on a frame assembly that includes a mounting rod 34, upper and lower frame members 36 and 38, the probe frame 32 and a sample frame 40. More specifically, the lower frame members 38 are directly coupled to the mounting rod 34 and the upper frame members 36 are coupled to the lower frame members 38 via compression vibration isolators 42. The probe frame 32 is then coupled to the upper frame members 36 through vertical support members 44 and the sample frame 40 is coupled to the probe frame 32 via a pivot connection 46. In effect, the sample and probe carousels 10 and 12 hang from the upper frame members 36 and are isolated from the lower frame members 38 and mounting rod 34 by the compression vibration isolators 42. The mounting rod 34 is coupled to any desired type of support structure. Mechanical vibrations from the support structure will be transmitted to the mounting rod 34 and lower frame members 38, but the mechanical vibrations will not be transmitted to support upper frame members 36 to which the sample and probe carousels 10 and 12 are attached due to the utilization of the compression vibration isolators 42.

Figure 5A:
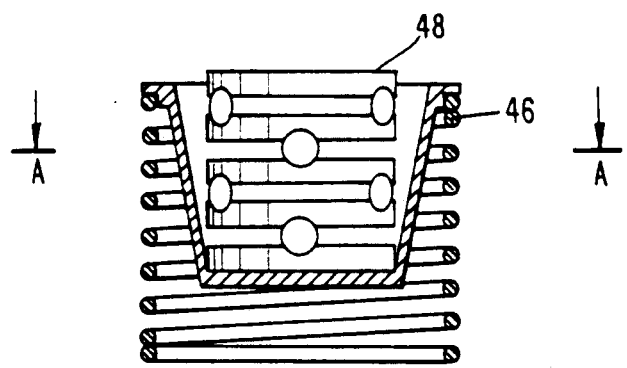
FIG. 5A is a partial sectional side view of the isolator shown in FIGS. 1 and 2.
Figure 5B:
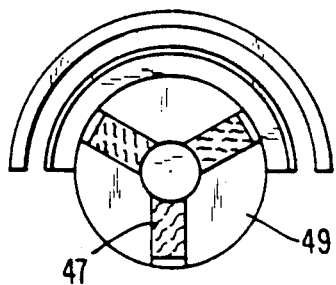
FIG. 5B is a sectional top view along line A—A of the isolator illustrated in FIG. 5A.

The compression vibration isolators 42 include a spring coil 46 and an elastomer damper 48 stacked within the spring coil 46 as illustrated in FIGS. 5A and 5B. For example, the spring coils 46 are manufactured from stainless steel and provide a resonant mechanical frequency of approximately two Hertz. The elastomer damper 48 is preferably composed of viton damper segments 47 interweaved with stacking discs 49 and provides a damping action.

As stated above, the relative rotation of the sample and probe carousels 10 and 12 provides the coarse X—Y scanning of samples placed on the sample carousel 10. As the probe carousels 10 and 12 are rotating, the relative displacement of the probe tip of the probe module 22 across the sample surface is along two arcs. Thus, the scanning of the probe module 22 is not actually a linear scanning in the X—Y directions. This pseudo X—Y scanning, however, is sufficient for the intended purpose.

Figure 6:
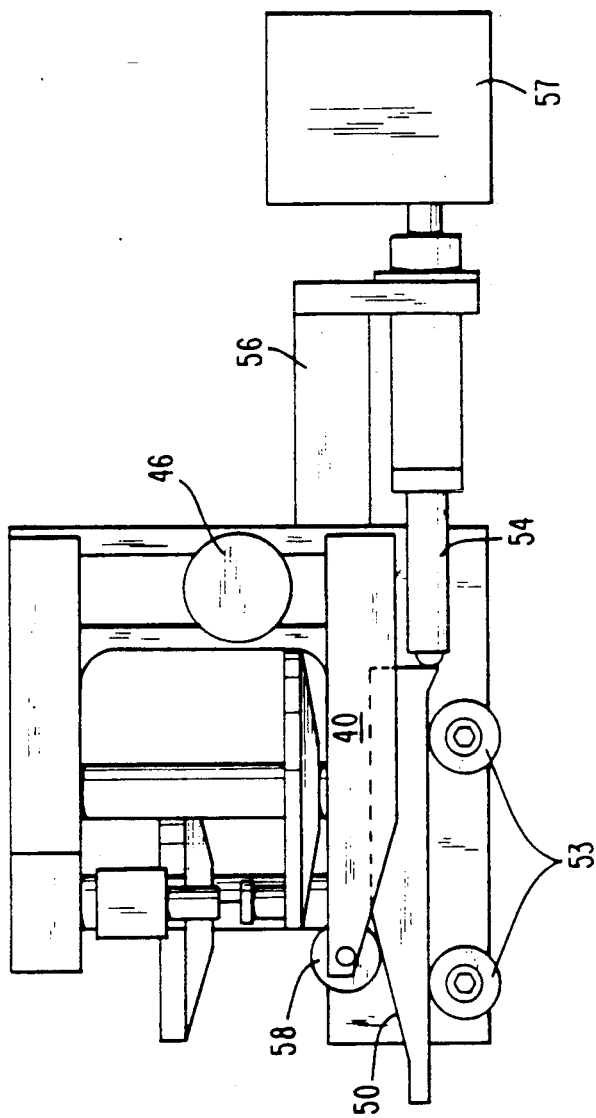
FIG. 6 is a partial side view of the STM illustrated in FIG. 1 which illustrates the approach ramp, sample frame connection, lead screw assembly and thermal expansion compensator of the STM illustrated in FIG. 1.

The coarse positioning between the probe tip to the sample, i.e., the Z coordinate, is controlled by the movement of an approach ramp 50 (See FIG. 2) on which the sample frame 40 rides. The approach ramp 50 rides on support rollers coupled to the probe frame 32 by support bearings 52 as shown in FIG. 6. The approach ramp 50 is coupled to a leadscrew assembly 54 that is driven by a leadscrew actuator 57. The leadscrew actuator 57 is of the same type used for the sample and probe actuators 14 and 16. Gear reduction in combination with the leadscrew and approach ramp gives a 0.01 micron Z movement with each step of the leadscrew actuator 57. A sample approach roller 58 is coupled to the sample frame 40 and rides on the inclined surface of the approach ramp 50. Thus, the sample frame 40 pivots about the pivot connection 46 as the approach ramp 50 is moved back and forth by the leadscrew assembly 54. It should be noted that the drive shaft coupling the sample actuator 14 to the sample worm drive 18 includes a bellows coupling 17 (see FIG. 1) to permit the pivotal movement of the sample carousel 10.

Maintaining the proper spacing between the probe tip 27 and the sample surface is crucial to achieving accurate scanning results. As discussed above, thermal expansion and contraction of structural elements can effect the tip to surface spacing. In particular, thermal dimensional changes in the leadscrew assembly 54 can lead to inaccurate movement of the approach ramp 50 resulting in improper tip spacing. This problem is eliminated by the use of a thermal expansion compensator 56 to mount the leadscrew assembly 54 to the probe frame 32. The thermal expansion compensator 56 is made from a material that matches the thermal expansion characteristics of the leadscrew assembly 54, i.e., the thermal expansion compensator 56 expands and contracts in the same manner as the leadscrew assembly 54. In a preferred embodiment, the leadscrew in the leadscrew assembly 54 is manufactured from No. 440C stainless steel and the compensator is manufactured from No. 304 stainless steel alloy. For example, without the thermal compensator 56, the approach ramp 50 would be moved as the leadscrew assembly 54 expands thereby forcing the sample frame 40 upward. The thermal compensator 56, however, expands in the same manner as the leadscrew assembly 54 thereby moving the leadscrew assembly away from the approach ramp 50 a distance that is equivalent to which the leadscrew assembly 54 moves toward the approach ramp 50 due to expansion. Thus, a positional equilibrium is maintained and the tip to sample spacing can be accurately controlled.

Figure 7:
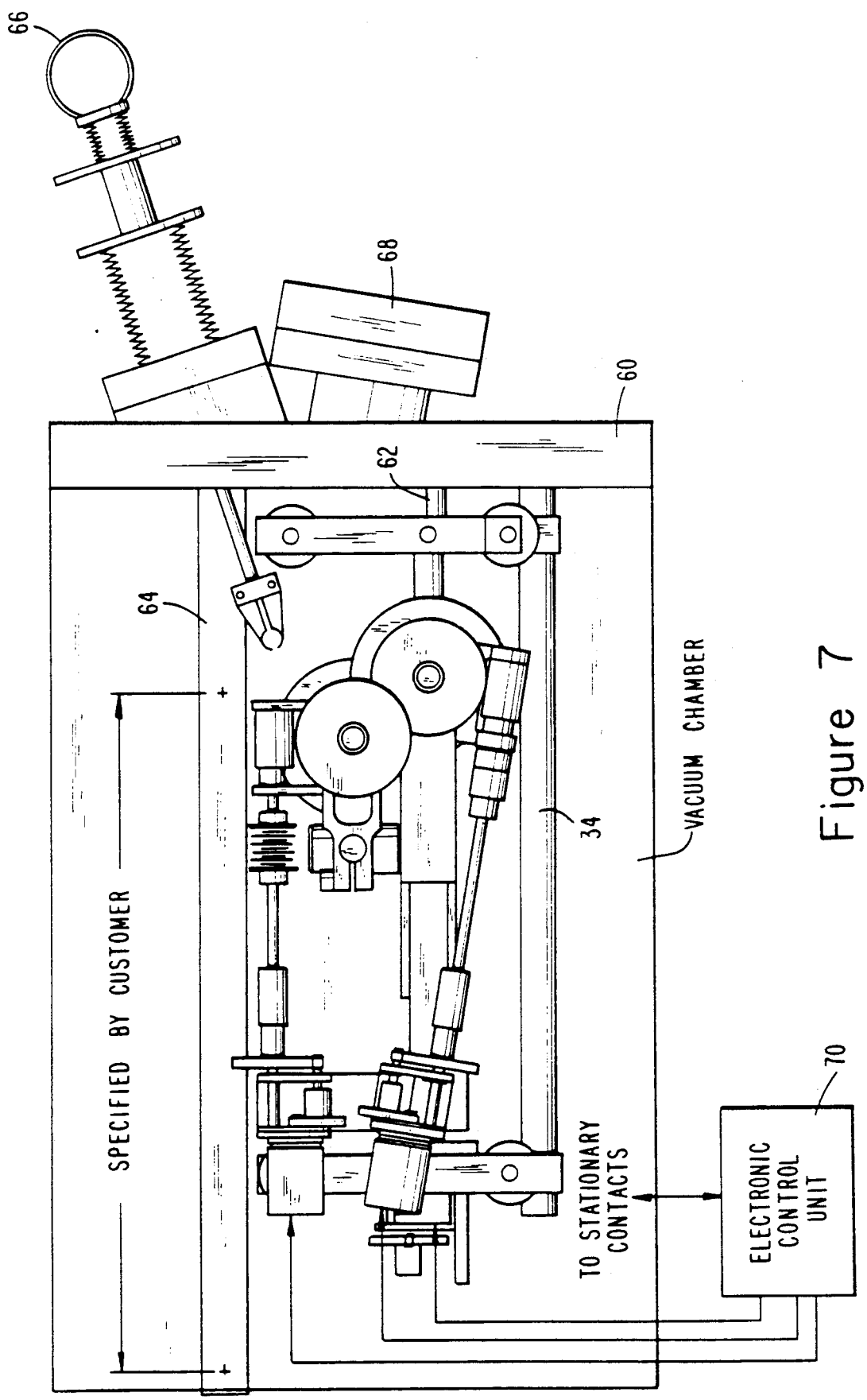
FIG. 7 illustrates the mounting of the STM illustrated in FIG. 1 in a vacuum chamber.

A preferred mounting for the STM within a vacuum chamber is illustrated in FIG. 7. In this embodiment, the mounting rod 34 is threaded and screwed into a flange 60. A second rod 62 is also threaded and screwed into the lower frame member 38 and secured to the flange 60. The second rod 62 insures that the lower frame members 38 do not slip on the mounting rod 34. A sample transfer system 64 in the form of a conveyor is provided adjacent to the sample carousel 10. A manual manipulator 66 is provided to transfer sample holders from the sample transfer system 64 to the sample carousel 10. Probe modules 22 can also be loaded from the transfer system 64 to the probe carousel 12 if desired. A viewport 68 is provided to enable an operator to visually monitor the transfer operation.

The overall operation of the STM is controlled by an electronic control unit 70 which is coupled to the sample, probe and leadscrew actuators as well as the stationary contacts 30. The electronic control unit 70 can be implemented using discrete logic circuitry, microprocessor control units or general purpose computing machines. The sample carousel 10 is rotated to move a desired sample to the scanning position. The probe carousel 12 is also rotated to bring a desired probe module 22 to the scanning position. Rotation of the probe module 22 to the scanning position brings the switching contacts 28 of the probe module 22 into contact with the stationary contacts 30 mounted on the probe frame 32. Control scanning signals can then be applied to the probe module 22 by the electronic control unit 70 and sample scanning signals can be returned to the electronic control unit 70. Once the sample and probe carousels 10 and 12 are properly positioned, the leadscrew actuator 57 is actuated to move the approach ramp 50 which in turn causes the sample frame 40 to pivot, thereby bringing the sample within the proper scanning distance from the probe tip. Thus, coarse positioning of the probe tip in relation to the sample surface is accomplished. The actual scanning of the probe tip over the sample surface during a measurement operation is controlled by the piezoelectric elements provided in the probe assembly 26.

The sample scanning signals are analyzed by the electronic control unit 70 to introduce a scanning tunneling image. Alternatively, the sample scanning signals are supplied to a separate unit for the analysis. In either case, the image is either displayed or a hard copy of the image is produced using conventional imaging techniques.

The invention has been described with particular reference to certain preferred embodiments thereof. It will be understood, however, that modifications and variations are possible with the spirit and scope of the appended claims. For example, while the stepper motor actuators in the illustrated embodiments are preferred to provide reproducibility, piezoelectric drives (e.g., Inchworm from Burleigh Instruments) could be employed for the sample and probe actuators. In addition, while the invention has particular industrial application in the field of scanning tunneling microscopy, the invention is also applicable to other industrial applications such as devices utilized for atomic force measurements (AFM), wherein the probe tip comes in contact with the sample surface. For example, the same structure disclosed in the present specification can be utilized as a AFM device instead of a STM device. In such a case, the control unit would bring the probe tip into contact with the sample surface to generate sample force signals. Thus, the invention is not limited to STMs but includes other devices such as AFMs. Other variations and modification are also possible, including mounting the sample frame directly to the upper frame members instead of coupling the sample frame to the probe frame.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. An apparatus comprising;
   a frame assembly including upper frame members coupled to lower frame members by an external vibration isolation structure;
   a sample carousel constructed to receive at least one sample to be scanned and a probe carousel constructed to receive at least one probe module including a probe tip, said sample and probe carousels being coupled to said upper frame members;
   a sample actuator and a probe actuator respectively coupled to said sample carousel and said probe carousel;
   positioning means for maintaining a scanning distance between said probe tip and said sample carousel; and
   control means for controlling the operation of said sample actuator and said probe actuator to rotate said sample and probe carousels and for controlling the operation of said positioning means to maintain said scanning distance.

2. An apparatus as claimed in claim 1, wherein:
   said external vibration isolation structure includes compression isolators.

3. An apparatus as claimed in claim 2, wherein:
   said compression isolators include a coil spring under compressive force and an elastomer located within said coil spring.

4. An apparatus as claimed in claim 1, wherein:
   said probe carousel is coupled to said upper frame member by a probe frame and said sample carousel is coupled to a sample frame that is coupled to said probe frame via a pivot connection.

5. An apparatus as claimed in claim 4, wherein:
   said positioning means includes an approach ramp movably coupled to said probe frame and an actuator means for moving said approach ramp, and
   wherein said sample frame includes an approach roller that contacts said approach ramp.

6. An apparatus as claimed in claim 5, wherein:
   said actuator means includes a leadscrew assembly in contact with said approach ramp.

7. An apparatus as claimed in claim 6, wherein:
   said leadscrew assembly is coupled to said probe frame by a thermal expansion compensator.

8. An apparatus as claimed in claim 1, wherein:
   stationary contacts are located adjacent said probe carousel and said probe modules include switching contacts, and
   said switching contacts make connection with said stationary contacts when said probe module is moved to a scanning position by said probe carousel.

9. An apparatus as claimed in claim 1, wherein:
   said sample and probe actuators include stepper motors respectively coupled to said sample and probe carousels by worm gear assemblies.

10. An apparatus comprising:
    sample carousel means for retaining at least one sample;
    probe carousel means for retaining at least one probe unit including a probe tip coupled to a frame assembly;
    actuator means coupled to said sample carousel means and said probe carousel means for independently rotating said sample carousel means and said probe carousel means to translationally dispose the probe tip relative to the sample in a predetermined scanning position; and
    displacement means coupled to said frame assembly for controlling a relative vertical displacement between said probe tip and said sample.

11. An apparatus comprising:
    sample carousel means for retaining at least one sample;
    probe carousel means for retaining at least one probe unit including a probe tip coupled to a frame assembly;

actuator means coupled to said sample carousel means and said probe carousel means for independently rotating said sample carousel means and said probe carousel means to a scanning position;

displacement means coupled to said frame assembly for controlling the relative vertical displacement between said probe tip and said sample; and vibration isolation means for isolating said sample carousel means, said probe carousel means and said displacement means from external sources of vibration.

12. An apparatus as claimed in claim 11, further comprising:

temperature compensation means located between said displacement means and said frame assembly for providing temperature compensation to prevent positioning errors due to thermal expansion and contraction.

13. A method of scanning tunneling microscopy, comprising the steps of:

locating at least one sample on a rotatable sample carousel and at least one piezoelectric probe unit including a probe tip on a rotatable probe carousel;

isolating said sample carousel and said probe carousel from external vibrations;

controlling coarse lateral positioning of said sample with respect to said probe tip by controllably rotating said sample and probe carousels;

controlling coarse vertical positioning of said sample with respect to said probe tip by providing relative axial motion of said sample and probe carousels; and controlling fine lateral and vertical positioning of said sample relative to said probe tip by applying control signals to said piezoelectric probe unit.

14. A method as claimed in claim 13, the further steps of:

applying control scanning signals to said probe unit; and analyzing sample signals generated by said probe unit, to produce a scanning tunneling microscopy image.

15. A method as claimed in claim 13, comprising the further step of;

selecting a new sample by rotating said sample carousel.

16. A method as claimed in claim 13, comprising the further step of;

selecting a new probe unit by rotating said probe carousel.

17. A scanning tunneling microscope comprising:

a frame assembly including upper frame members coupled to lower frame members by compression isolators, each compression isolator including a coil spring under compressive force and an elastomer located within said coil;

a sample carousel constructed to receive at least one sample to be scanned and a probe carousel constructed to receive at least one probe module including a probe tip, wherein said probe carousel is coupled to said upper frame member by a probe frame and said sample carousel is coupled to a sample frame that is coupled to said probe frame via a pivot connection;

a sample actuator and a probe actuator respectively coupled to said sample carousel and said probe carousel;

a positioning mechanism including an approach ramp movably coupled to said probe frame and a positioning actuator coupled to said approach ramp, wherein said sample frame includes an approach roller that contacts and rides on said approach ramp; and control means for controlling the operation of said sample actuator, said probe actuator and said positioning actuator to rotate said sample and probe carousels and for controlling the operation of said positioning means to maintain a scanning distance, between said probe tip and said sample.

18. An atomic force measurement device comprising:

a frame assembly including upper frame members coupled to lower frame members by compression isolators, each compression isolator including a coil spring under compressive force and an elastomer located within said coil;

a sample carousel constructed to receive at least one sample to be tested and a probe carousel constructed to receive at least one probe module including a probe tip, wherein said probe carousel is coupled to said upper frame member by a probe frame and said sample carousel is coupled to a sample frame that is coupled to said probe frame via a pivot connection;

a sample actuator and a probe actuator respectively coupled to said sample carousel and said probe carousel;

a positioning mechanism including an approach ramp movably coupled to said probe frame and a positioning actuator coupled to said approach ramp, wherein said sample frame includes an approach roller that contacts and rides on said approach ramp; and control means for controlling the operation of said sample actuator, said probe actuator and said positioning actuator to rotate said sample and probe carousels and for controlling the operation of said positioning means to maintain contact between said probe tip and a sample on said sample carousel.

* * * * *